United States Patent Office 2,882,196
Patented Apr. 14, 1959

2,882,196

PESTICIDAL COMPOSITIONS

Glentworth Lamb, Stamford, and Elton L. Clark, Bethel, Conn., assignors to American Cyanamid Company, New York, N.Y., a corporation of Maine No Drawing. Application August 22, 1956
Serial No. 605,471

3 Claims. (Cl. 167—22)

The present invention relates to pesticidal compositions and is particularly concerned with novel compositions including as active toxic ingredients O,O-diethyl S-ethylthiomethyl phosphorodithioate and a trichloromethyl benzenethiosulfonate compound.

O,O - diethyl S - ethylthiomethyl phosphorodithioate (commonly identified as Thimet) has recently come into wide usage as an agricultural insecticidal toxicant. This compound when applied on or in proximity to seeds will protect the developing seedlings and young plants from attack by pests such as aphids, beetles, thrips, leaf hoppers, mites and the like. This unique action is brought about by absorption and translocation of the compound through the plant sap to all growing parts of the plant. In such use, the action of the compound has been established as being relatively specific with little or no control being accomplished of parasitic fungi which may cause a reduced number of seedlings to emerge and develop in the planted areas.

In accordance with the present invention, it has been found that a trichloromethyl benzenethiosulfonate compound of the formula

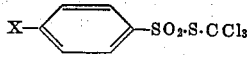

wherein X represents Cl or $CH_3$ may be combined with O,O-diethyl S-ethylthiomethyl phosphorodithioate to obtain pesticidal compositions having very desirable properties for the control of insects and fungus organisms. In such mixtures there appears to be no chemical incompatibility between the toxic constituents, and the toxicants appear to be mutually activated so that a greater than additive effect is accomplished in controlling pests and particularly in regard to establishing an increased stand of healthy vigorous plants.

The new toxicant mixtures may be utilized with an inert material as a carrier, for example water, an organic solvent, a finely divided solid, a wetting and dispersing agent, an aqueous emulsion, or any suitable combination of these.

In operating in accordance with this invention any suitable amount of the trichloromethyl benzenethiosulfonate compound may be employed in combination with O,O-diethyl S-ethylthiomethyl phosphorodithioate to obtain compositions in which the toxicants are mutually activating. The exact amount of either toxicant in any one combination is capable of considerable variation. In general, from one to 30 parts by weight of the trichloromethyl benzenethiosulfonate compound is utilized with each 30 parts of O,O-diethyl S-ethylthiomethyl phosphorodithioate.

More important considerations in determining the preferred proportions are the type of composition in which the mixture of toxicants is to be applied, and the period for which residual control is required. For example, in seed applications, good results are obtained with compositions containing from about 20 to about 60% by weight of a mixture of toxicants within the above-noted ratios. When dusts are applied to the soil, particularly as furrow applications, the mixture of toxicants may constitute from about one to about 10% of the weight of the final composition. In spray applications, the toxicant mixture is usually applied in the range of from about one to about 20 pounds per acre, and preferably in the range of from 3 to 8 pounds per acre.

In the preparation of dusts, the mixture of toxicants may be mixed with the finely divided carrier in any conventional manner. Operable carriers include clays, talc, wood flour, activated carbon, silica, chalk and the like.

When a concentrate is prepared, the mixture of toxicants is ground or otherwise dispersed with wetting or dispersing agents to provide products adapted to be dispersed in water or other aqueous spray compositions. The toxicants may also be separately compounded in concentrate form and mixed together upon dilution in the spray tank. Suitable wetting and dispersing agents include sodium lauryl sulfate, isopropylnaphthalene sodium sulfonate (Aerosol OS), dioctyl sodium sulfosuccinate (Aerosol OT), alkylated aryl polyether alcohol (Triton X100), modified phthalic glycerol alkyd resin (Triton B1956), and the salts of alkyl and aryl sulfonic acids (Daxad 21). Suitable sticking agents, which may be employed in compositions applied to seeds, include gelatins, methylcellulose, soluble casein and spindle oil.

The following examples, in which parts are by weight, are illustrative of the invention.

EXAMPLE I

In order to show the unexpectedly beneficial effect obtainable in treating seeds in accordance with this invention, several treating compositions were prepared.

A dust was prepared by grinding and mixing together 44 parts of O,O-diethyl S-ethylthiomethyl phophorodithioate, 5 parts of trichloromethyl p-chlorobenzenethiosulfonate, 2 parts of methylcellulose, and 49 parts of activated carbon (Nuchar C115N). This composition was labeled Dust A.

Similarly, a dust was prepared containing 5 parts of trichloromethyl p-chlorobenzenethiosulfonate, 2 parts of methylcellulose and 93 parts of activated carbon. This composition was labeled Dust B.

A third dust was prepared in the same manner. It contained 44 parts of O,O-diethyl S-ethylthiomethyl phosphorodithioate, 2 parts of methylcellulose and 54 parts of activated carbon. This composition was labeled Dust C.

Each composition was applied to cotton seeds (variety Deltapine 15) in the proportion of 8 parts of dust per 100 parts of seed. A rotating drum type seed treater was used to obtain uniform distribution of the compositions on the seed, and 2% water, based on seed weight, was added to obtain good coating and adherence.

The treated seeds were planted in soil of good fertility in a greenhouse held at approximately 80° F., using duplicate flats of 50 seeds each. Table I gives the percent emergence or stand of seedlings from each treatment, counts being made twenty-one days after planting.

*Table I*

| Dust: | Percent stand of cotton seedlings |
|---|---|
| A | 87 |
| B | 39 |
| C | 16 |

It is readily apparent that Dust A produced a much better result than would have been expected from the use of either Dust B or C alone.

EXAMPLE II

Example I was repeated using cotton seed (variety Coker 100 wilt), and with the temperature of the greenhouse being held at approximately 65° F., an adverse temperature for the development and growth of cotton plants. Even under these conditions, Dust A provided a good stand of seedlings which reflected the synergistic effect obtained with the mixture of the toxicants. Table II gives the percent stand of seedlings from each treatment.

*Table II*

| Dust: | Percent stand of cotton seedlings |
|---|---|
| A | 68 |
| B | 29 |
| C | 8 |

EXAMPLE III

Four weeks after planting, cotton plants which had developed from seed treated with Dusts A, B and C were infested with two-spotted spider mites (*Tetranychus bimaculatus*). The infested plants were examined three days later, and the percent kill of mites was recorded as follows:

*Table III*

| Dust: | Percent kill of mites |
|---|---|
| A | 100 |
| B | 7 |
| C | 100 |

It can be seen that Dust A was outstanding in establishing a strong vigorous stand of cotton plants, and in keeping the developing plants free of attack by mites.

EXAMPLE IV

A dust was prepared by mixing together 44 parts of O,O-diethyl S-ethylthiomethyl phosphorodithioate, 10 parts of trichloromethyl p-methylbenzenethiosulfonate, 2 parts of methylcellulose and 44 parts of activated carbon (Nuchar C115N). This composition was labeled Dust D.

Similarly, a dust was prepared containing 10 parts of trichloromethyl p-methylbenzenethiosulfonate, 2 parts of methylcellulose and 88 parts of activated carbon. This composition was labeled Dust E.

A third dust was prepared in the same manner. It contained 44 parts of O,O-diethyl S-ethylthiomethyl phosphorodithioate, 2 parts of methylcellulose and 54 parts of activated carbon. This composition was labeled Dust F.

Each composition was applied to cotton seeds (variety Deltapine 15) in the proportion of 4 parts of dust per 50 parts of seed. The treated seeds were planted in soil of good fertility in a greenhouse held at approximately 80° F., using duplicate flats of 50 seeds each. Table IV gives the percent stand of seedlings from each treatment, counts being made twenty-one days after planting.

*Table IV*

| Dust: | Percent stand of cotton seedlings |
|---|---|
| D | 90 |
| E | 40 |
| F | 22 |

EXAMPLE V

Example IV was repeated with the temperature of the greenhouse being held at approximately 65° F. Table V gives the percent stand of seedlings from each treatment.

*Table V*

| Dust: | Percent stand of cotton seedlings |
|---|---|
| D | 68 |
| E | 10 |
| F | 7 |

EXAMPLE VI

Four weeks after planting, cotton plants which had developed from seed treated with Dusts D, E and F were infested with two-spotted spider mites. The infested plants were examined three days later, and the percent kill of mites was recorded as follows:

*Table VI*

| Dust: | Percent kill of mites |
|---|---|
| D | 100 |
| E | 0 |
| F | 100 |

EXAMPLE VII

Dusts D, E and F were applied to pea seeds (variety Perfection) in the proportion of one part of dust per 50 parts of seed. The treated seeds were planted in soil of good fertility in a greenhouse held at approximately 80° F., using duplicate flats of 50 seeds each. Table VII gives the percent stand of seedlings from each treatment, counts being made twenty-one days after planting.

*Table VII*

| Dust: | Percent stand of pea seedlings |
|---|---|
| D | 96 |
| E | 26 |
| F | 6 |

EXAMPLE VIII

Example VII was repeated with the temperature of the greenhouse being held at approximately 65° F. Table VIII gives the percent stand of seedlings from each treatment.

*Table VIII*

| Dust: | Percent stand of pea seedlings |
|---|---|
| D | 90 |
| E | 22 |
| F | 6 |

EXAMPLE IX

Four weeks after planting, plants which had developed from pea seed treated with Dusts D, E and F were infested with aphids. The infested plants were examined three days later, and the percent kill of aphids was recorded as follows:

*Table IX*

| Dust: | Percent kill of aphids |
|---|---|
| D | 100 |
| E | 0 |
| F | 99 |

We claim:

1. A pesticidal composition comprising as active toxic ingredients from about one to about 30 parts by weight of a trichloromethyl benzenethiosulfonate compound of the formula

wherein X represents a member of the group consisting of Cl and CH₃, for each 30 parts of O,O-diethyl S-ethylthiomethyl phosphorodithioate.

2. A pesticidal composition comprising an inert carrier and dispersed therein as active toxic ingredients from about one to about 30 parts by weight of a trichloromethyl benzenethiosulfonate compound of the formula

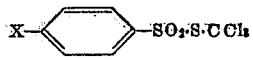

wherein X represents a member of the group consisting of Cl and CH₃, for each 30 parts of O,O-diethyl S-ethylthiomethyl phosphorodithioate.

3. A pesticidal composition comprising an inert dust carrier and dispersed therein as active toxic ingredients from about one to about 30 parts by weight of a trichloromethyl benzenethiosulfonate compound of the formula

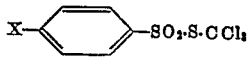

wherein X represents a member of the group consisting of Cl and CH₃, for each 30 parts of O,O-diethyl S-ethylthiomethyl phosphorodithioate.

References Cited in the file of this patent

FOREIGN PATENTS 1,099,722     France _____ Mar. 23, 1955

OTHER REFERENCES

Wadley: The evidence Required to Show Synergistic Action of Insecticides and a Short Cut in Analysis, U.S.D.A., June 1945 (ET–223), pp. 1–7.

Jour. Econ. Ent., vol. 50, No. 2, p. 226.